(12) United States Patent
Corazza et al.

(10) Patent No.: US 12,404,076 B2
(45) Date of Patent: Sep. 2, 2025

(54) CONSUMER PRODUCT, RECLOSABLE FLEXIBLE CONTAINER AND MULTI-LAYER COMPOSITE SHEET

(71) Applicant: Fameccanica.Data S.p.A., San Giovanni Teatino (IT)

(72) Inventors: Federico Corazza, San Giovanni Teatino (IT); Nicola Baldecchi, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 99 days.

(21) Appl. No.: 18/527,794

(22) Filed: Dec. 4, 2023

(65) Prior Publication Data

US 2024/0182207 A1 Jun. 6, 2024

(30) Foreign Application Priority Data

Dec. 5, 2022 (IT) ......................... 102022000024987

(51) Int. Cl.
| | | |
|---|---|---|
| *B65D 30/08* | (2006.01) | |
| *B32B 1/00* | (2006.01) | |
| *B32B 7/12* | (2006.01) | |
| *B32B 27/10* | (2006.01) | |
| *B65D 33/25* | (2006.01) | |
| *B65D 65/42* | (2006.01) | |
| *B65D 65/46* | (2006.01) | |

(52) U.S. Cl.
CPC ............... *B65D 31/02* (2013.01); *B32B 1/00* (2013.01); *B32B 7/12* (2013.01); *B32B 27/10* (2013.01); *B65D 33/25* (2013.01); *B65D 65/42* (2013.01); *B65D 65/466* (2013.01); *B32B 2255/10* (2013.01); *B32B 2255/205* (2013.01); *B32B 2307/7163* (2013.01); *B32B 2307/718* (2013.01); *B32B 2439/46* (2013.01); *B65D 2565/382* (2013.01)

(58) Field of Classification Search
CPC ........ B65D 31/02; B65D 33/25; B65D 65/42; B65D 65/466; B65D 2565/382; B32B 1/00; B32B 7/12; B32B 27/10; B32B 2255/10; B32B 2255/205; B32B 2307/7163; B32B 2307/718; B32B 2439/46
USPC ........................................................ 383/1, 63
See application file for complete search history.

(56) References Cited

U.S. PATENT DOCUMENTS

| | | |
|---|---|---|
| 2003/0231811 A1 | 12/2003 | Hodson et al. |
| 2021/0107263 A1 | 4/2021 | Bartolucci et al. |
| 2022/0112663 A1 | 4/2022 | Boswell et al. |

FOREIGN PATENT DOCUMENTS

| | | | |
|---|---|---|---|
| GB | 2481627 A | 1/2012 | |
| WO | WO-2010069888 A1 * | 6/2010 | ............. B32B 27/08 |
| WO | WO-2024194161 A1 * | 9/2024 | ......... B65D 85/8043 |

OTHER PUBLICATIONS

Search Report dated May 19, 2023. 7 pages.

* cited by examiner

*Primary Examiner* — Jes F Pascua
(74) *Attorney, Agent, or Firm* — RMCK Law Group PLC

(57) ABSTRACT

A consumer product including at least one water-soluble single-dose article and a reclosable flexible container formed by a multilayer composite sheet including a layer of paper, a layer of compostable adhesive, and a layer of biodegradable plastic material having a metallized coating.

10 Claims, 1 Drawing Sheet

CONSUMER PRODUCT, RECLOSABLE FLEXIBLE CONTAINER AND MULTI-LAYER COMPOSITE SHEET

CROSS-REFERENCE TO RELATED APPLICATION

This application claims priority to Italian Patent Application No. 102022000024987 filed Dec. 5, 2022. The disclosure of the above applications is incorporated herein by reference in its entirety.

FIELD OF THE INVENTION

The present invention generally relates to the packaging of single-dose articles for washing machines and dishwashers.

Specifically, the invention relates to a consumer product comprising a reclosable flexible container and a plurality of single-dose articles for washing machines and dishwashers.

According to another aspect, the invention relates to a reclosable flexible container and a multilayer composite sheet.

BACKGROUND ART

Single-dose articles for washing machines and dishwashers, often called "pouches", are formed of liquid and/or powdered products enclosed in a film of water-soluble material. The liquid and/or powdered products contained in the single-dose articles may be detergents, fabric softeners, products for the care of washing machines or dishwashers, etc.

Single-dose articles are becoming increasingly popular due to their ease of use for the user and positive impact on sustainability as they contain the precise amount of product for a load and reduce the waste of cleaning products. The film of water-soluble material dissolves on contact with water and the product contained therein is released into the surrounding water to produce a washing solution.

One problem is that during transport and storage, the container containing water-soluble single-dose articles may be exposed to humidity conditions that may cause multiple single-dose articles to stick together and, in the worst-case scenario, even a failure of the water-soluble film and the release of the products inside the container.

For this reason, water-soluble single-dose articles are usually packaged in rigid or flexible plastic containers.

Plastic containers offer effective protection against humidity but have a negative impact on sustainability.

EP3778411A1 discloses a consumer product comprising a plurality of water-soluble single-dose articles and a container having an inner surface made of paper-based material, such that the water-soluble film of the single-dose articles comes into direct contact with the paper-based material of the inner surface.

Paper-based containers are a sustainable alternative to plastic containers. However, paper or cardboard-based containers often do not offer effective protection against humidity. In fact, the recyclability characteristics of the material are often antithetical to the humidity protection characteristics.

Packaging sheets for food products are available on the market, recyclable with paper and equipped with a plastic barrier film. However, packaging sheets for food products may not be compatible with the long-term storage of articles and single-dose for washing machines dishwashers, also taking into account the fact that single-dose articles for washing machines and dishwashers have extremely longer storage times than those of food products.

OBJECT AND SUMMARY

The object of the present invention is to overcome the problems of the prior art.

According to the present invention, this object is achieved by a consumer product having the characteristics of claim 1.

According to another aspect, the invention relates to a reclosable flexible container having the characteristics of claim 9 and a multilayer composite sheet having the characteristics of claim 10.

The claims form an integral part of the technical disclosure provided in relation to the invention.

BRIEF DESCRIPTION OF THE DRAWINGS

The invention will now be described in detail with reference to the attached drawings, given purely by way of non-limiting example, wherein.

DETAILED DESCRIPTION

Figure 1:
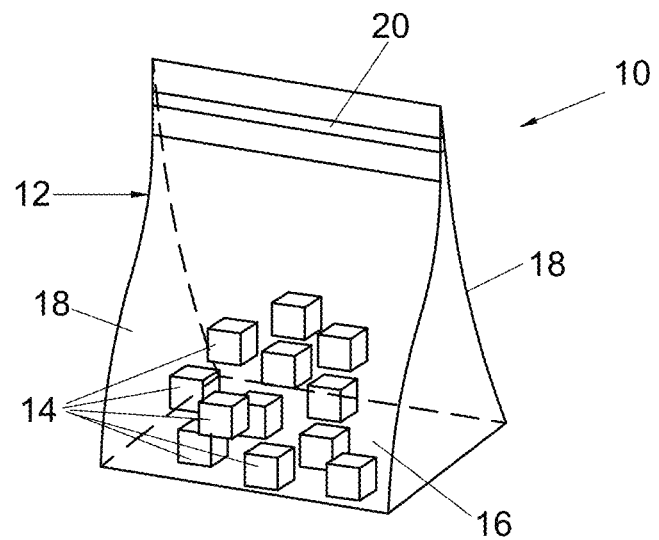
FIG. 1 is a schematic perspective view of a consumer product according to the present invention.

With reference to FIG. 1, numeral 10 indicates a consumer product according to the present invention. The consumer product 10 comprises a reclosable flexible container 12 containing at least one water-soluble single-dose article 14 for washing machines or dishwashers. The reclosable flexible container 12 typically includes a plurality of single-dose articles 14 (often called "pouches") formed of measured quantities of liquid and/or powdered products enclosed in a film of water-soluble material.

The reclosable flexible container 12 is a stand-up pouch or Doypack, a type of flexible packaging that is able to stand upright on the bottom for display, storage and use.

The bottom of the reclosable flexible container 12 forms a base 16 that holds the reclosable flexible container 12 filled with single-dose articles 14 in an upright position for display or use.

The reclosable flexible container 12 has two opposing flexible walls 18 having reclosable zips 20 in their upper part, which can be opened to access the inside of the container 12 and closed to keep the container 12 closed after its opening.

The reclosable zips 20 may be separate components fixed to the reclosable flexible container 12, for example, by glue or welding, or they can be formed integrally in the walls 18 of the container 12, for example, as described in EP 21213592.5 by the same applicant.

The reclosable flexible container 12 has a height H, a width L and a depth P.

The dimensions H, L, P may be optimized to contain single-dose articles 14 for washing machines or dishwashers. In possible embodiments, the reclosable flexible container 12 may have the dimensions shown in the following table:

| Format | H | L | P | W |
| --- | --- | --- | --- | --- |
| a | 150 | 150 | 70 | 370 |
| b | 210 | 200 | 90 | 510 |
| c | 260 | 210 | 90 | 610 |
| d | 300 | 280 | 90 | 690 |
| e | 320 | 295 | 110 | 750 |

The measures indicated above are expressed in mm. The measure W indicates the width of a continuous flexible sheet from which the respective container is obtained. The containers may be continuously formed on the same machine which then fills them, or they may be pre-formed. In both cases, the formation of the containers always starts from a reel containing a continuous flexible sheet.

Figure 2:
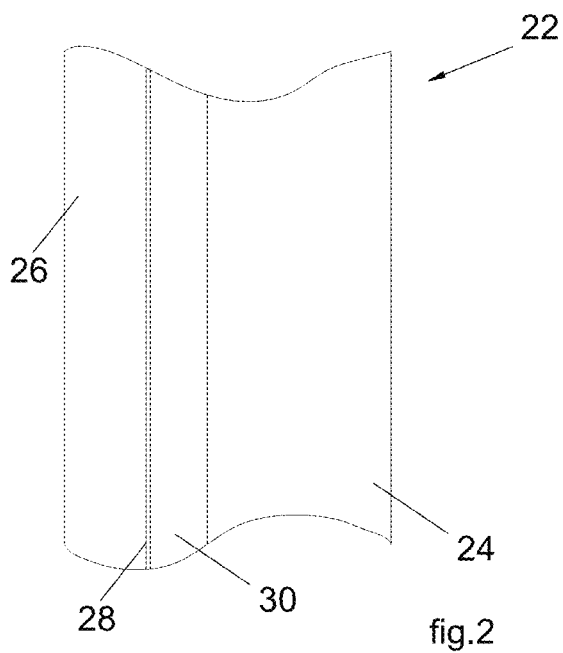
FIG. 2 is a schematic cross-sectional view illustrating a multilayer composite sheet used to form the container of a consumer product according to the present invention.

The reclosable flexible container 12 is formed from a multilayer composite sheet 22 having the structure illustrated in FIG. 2.

The multilayer composite sheet 22 comprises, from the outside towards the inside of the container 12, a layer of paper 24, a layer of compostable adhesive 30, and a layer of biodegradable and compostable plastic material 26 having a metallized coating 28.

The paper layer 24 has a basis weight of between 60-100 g/m$^2$, the layer of compostable adhesive 30 has a basis weight of between 2-4 g/m$^2$, and the layer of biodegradable plastic material 26 has a basis weight of between 20-40 g/m$^2$.

The biodegradability of the biodegradable plastic material layer 26 is established in accordance with the EN 14046 standard. The compostability of the compostable adhesive layer 26 is established according to the EN 13432:2002 standard.

The metallized coating 28 may be deposited on the layer of biodegradable plastic material 26 using the technique called "Chemical Vapor Deposition".

The compostable adhesive layer 30 is included between the paper layer 24 and the metallized coating 28 of the biodegradable plastic material 26.

In possible embodiments, the paper layer 24 has a basis weight of between 60-80 g/m$^2$.

In possible embodiments, the paper layer 24 has a basis weight of between 80-100 g/m$^2$.

In possible embodiments, the compostable adhesive layer 30 has a basis weight of between 3-4 g/m$^2$.

In possible embodiments, the layer of biodegradable plastic material 26 has a basis weight of between 30-40 g/m$^2$.

The paper layer 24 may be made of kraft paper. The paper layer 24 may have a basis weight of 70 g/m$^2$±5% or 90 g/m$^2$±5%.

The layer 26 of biodegradable plastic material 26 may be made of the material marketed under the Mater-Bi® brand by the Novamont company.

The inner layer 26 with the related metallized layer 28 may have a basis weight of 31.75 g/m$^2$±5%.

The compostable adhesive layer 26 may have a basis weight of 3.75 g/m$^2$±5%.

With the same type of multilayer composite sheet 22, two different thicknesses of the outer layer of paper were evaluated: 70 and 90 g/m$^2$.

Two multilayer composite sheets 22 were therefore evaluated as follows:

1) Outer layer of 70 g/m$^2$ white kraft paper, 3.75 g/m$^2$ compostable adhesive, inner layer of Mater-bi® with metallized paint;

2) Outer layer of 90 g/m$^2$ white kraft paper, 3.75 g/m$^2$ compostable adhesive, inner layer of Mater-bi® with metallized paint.

Multilayer composite sheets 22 composed in this way are recyclable with paper according to the UNI 11743:2019 standard and Aticelca® 501/2017. The Aticelca® 501/2017 method defines the characteristics of the products so that they can be recycled with paper. The wording and icon "RECYCLABLE WITH PAPER—Aticelca® 501" are a communication tool that allows companies to inform their customers and the final consumer about the level of recyclability with paper achieved, based on the results of the analyzes conducted on materials and products. This method defines as predominantly cellulosic products finished objects (such as packaging, printed matter, articles for domestic use, etc.) predominantly composed (over 50% by weight) of predominantly cellulosic materials. The method consists of pulping and dilution with water and the subsequent measurement of the parameters relating to: percentage of coarse waste, area of adhesive particles, percentage of fiber flakes, adhesiveness and optical inhomogeneity.

The consumer products 10 have undergone aging tests to evaluate the protection afforded to the single-dose articles 14 enclosed in the reclosable flexible container 12.

The tests were carried out using reclosable flexible containers 12 as previously described, filled with single-dose articles 14 of liquid detergent enclosed in a water-soluble film.

The reclosable flexible container 12 filled with single-dose articles 14 was closed both by means of the reclosable zips 20 and by sealing the edge carried out using a bench welder.

The consumer products 10 thus composed were placed in a climatic chamber at a temperature of 38° C. and humidity of 90% RH. The residence times in the climatic chamber were 24, 48, and 72 hours, respectively.

After remaining in the climatic chamber in the aforesaid conditions, the containers were opened and it was checked whether the following defects were present:

Defect 1: presence of single-dose articles 14 adhering to one or more of the adjacent single-dose articles 14;

Defect 2: presence of single-dose items 14 adhering to an inner wall of the reclosable flexible containers 12;

Defect 3: presence of single-dose articles 14 with breakage of the water-soluble film and leakage of detergent.

To have a better understanding of the sealing conditions of the containers, the tests in the climatic chamber were also repeated with the containers closed only with the reclosable zips, eliminating the terminal welding of the containers.

The test results gave excellent results in all conditions. None of the above defects were found under all test conditions.

One of the main advantages of the present invention is the possibility of producing consumer products 10 with reclosable flexible containers 12 recyclable with paper, which ensure the humidity resistance of single-dose articles 14 for washing machines or dishwashers for surprisingly long times, avoiding defects in the single-dose articles 14 such as adhesions and breakages.

The present invention allows the creation of reclosable flexible containers 12 that are recyclable with paper and have sealing and robustness characteristics equivalent to those of corresponding containers made of plastic materials.

One characteristic of the present invention is that it does not require any modification to the automatic machines that package single-dose articles 14 for washing machines or dishwashers in reclosable flexible containers.

Of course, without prejudice to the principle of the invention, the details of construction and the embodiments may be varied with respect to those described and illustrated, without thereby departing from the scope of the invention as defined by the claims that follow.

The invention claimed is:

1. A consumer product, comprising:
    at least one water-soluble single-dose article, and
    a reclosable flexible container having a base and two opposite flexible walls having reclosable zips in their upper parts,
    wherein the reclosable flexible container is formed by a multilayer composite sheet comprising a layer of paper, a layer of compostable adhesive, and a layer of biodegradable plastic material comprising a surface at least partly coated with a metallized coating,
    wherein the paper layer has a basis weight of between 60 g/m$^2$ and 100 g/m$^2$, the compostable adhesive layer has a basis weight of between 2 g/m$^2$ and 4 g/m$^2$, and the layer of biodegradable plastic material with the metallized coating has a basis weight of between 20 g/m$^2$ and 40 g/m$^2$.

2. The consumer product of claim 1, wherein the metallized coating comprises aluminum and/or its oxides.

3. The consumer product of claim 1, wherein the compostable adhesive layer is comprised between the paper layer and the metallized coating of the biodegradable plastic material.

4. The consumer product of claim 1, wherein the paper layer has a basis weight comprised between 60 g/m$^2$ and 80 g/m$^2$.

5. The consumer product of any of claim 1, wherein the paper layer has a basis weight comprised between 80 g/m$^2$ and 100 g/m$^2$.

6. The consumer product of claim 1, wherein the layer of compostable adhesive has a basis weight comprised between 3 g/m$^2$ and 4 g/m$^2$.

7. The consumer product of claim 1, wherein the layer of biodegradable plastic material has a basis weight comprised between 30 g/m$^2$ and 40 g/m$^2$.

8. The consumer product of claim 1, wherein the paper layer is made of kraft paper.

9. A reclosable flexible container, comprising:
    a base and two opposing flexible walls having in their upper parts reclosable zips,
    wherein the reclosable flexible container is formed from a multilayer composite sheet comprising a layer of paper, a layer of compostable adhesive, and a layer of biodegradable plastic material comprising a surface at least partly coated with a metallized coating, and
    wherein the paper layer has a basis weight comprised between 60 g/m$^2$ and 100 g/m$^2$, the layer of compostable adhesive has a basis weight comprised between 2 g/m$^2$ and 4 g/m$^2$, and the layer of biodegradable plastic material with metallized coating has a basis weight comprised between 20 g/m$^2$ and 40 g/m$^2$.

10. A multilayer composite sheet, comprising:
    a layer of paper, a layer of compostable adhesive, and a layer of biodegradable plastic material comprising a surface at least partially coated with a metallized coating,
    wherein the layer of paper has a basis weight comprised between 60 g/m$^2$ and 100 g/m$^2$, the layer of compostable adhesive has a basis weight comprised between 2 g/m$^2$ and 4 g/m$^2$, and the layer of biodegradable plastic material with the metallized coating has a basis weight of between 20 g/m$^2$ and 40 g/m$^2$.

* * * * *